United States Patent Office 2,761,790
Patented Sept. 4, 1956

2,761,790

ETHER OF HOMO-ABIETIC ACID, METHOD OF PREPARING SAME AND COMPOSITIONS CONTAINING IT

Owen S. Eckhardt and Ismond E. Knapp, Columbia, Miss., assignors to Leach Brothers, Inc., a corporation of Wisconsin No Drawing. Application April 18, 1951, Serial No. 221,722

11 Claims. (Cl. 106—218)

Our invention relates to the production of a new and useful chemical compound which is derived from rosins, particularly wood rosins, for example, FF wood rosin, WW wood rosin, sulfate wood rosin, and the like containing substantial proportions of abietic acid. It relates more in particular to reaction products which contain relatively high proportions of said new chemical compound. This chemical compound, which has been identified as an ether of homo-abietic acid, has the following formula:

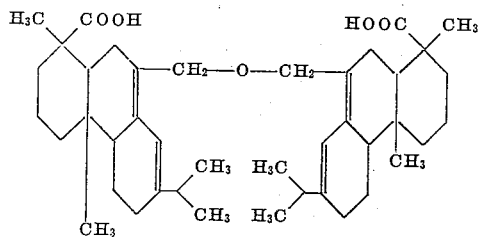

It is prepared, in accordance with our invention, by reacting the wood rosin or the like with formaldehyde or a material which, during the reaction, releases formaldehyde, the reaction being carried out under certain conditions which, it has been found, are conducive to the formation of the ether of homo-abietic acid.

The novel ether of homo-abietic acid, as well as the novel reaction products containing substantial proportions of the ether of homo-abietic acid, are characterized by a number of important properties and characteristics. Depending on the exact method of preparation and the degree of purificiation, the reaction products have melting points ranging from about 180 degrees C. to about 230 degrees C. The product has specific optical rotation $[\alpha]_D = +17°$ to $+20°$. It is stable to heat. It is readily soluble in aromatic hydrocarbons such as benzene and toluene, also in methyl alcohol, and turpentine, as well as in chlorinated solvents such as chloroform, carbon tetrachloride and the like. The system of conjugated double bonds, characteristic of the 1-abietic acid mole,-cule, appears to be intact and in no way disturbed by the formation of the ether. The molecular weight of the ether of homo-abietic acid (Rast method) compares well with the calculated value of 646 for the formula set forth above. Molecular weight determinations by the Rast method on reaction products containing predominant portions of the novel ether of homo-abietic acid have fallen within the range of 560 to 650, depending upon the purity of the reaction product or, in other words, upon its content of the ether of homo-abietic acid. The acid numbers of typical samples of the ether of homo-abietic acid, made in accordance with the present invention, fall within the range of 171 to 172, thus showing that the carboxyl groups present in 1-abietic acid are essentially unchanged in the ether of the homo-abietic acid, it being noted that, in this connection, the calculated acid number of the ether of homo-abietic acid of the above formula is 173.7.

Reactions between rosin and formaldehyde, under various conditions, have heretofore been disclosed in the prior art but, in no case, so far as we are aware, have such reactions been carried out under conditions such as to result in the production of the novel ether of homo-abietic acid of our present invention, or of reaction products containing said novel ether of homo-abietic acid. Typical of such prior art disclosures are those found in U. S. Patents Nos. 1,243,312; 1,658,828; and 2,374,657.

In accordance with our invention, wood rosin or the like is initially reacted with formaldehyde (or a material which, during the reaction releases formaldehyde, as, for example, flake or granular paraformaldehyde), at a temperature of about 100 to about 120 degrees C., to produce an intermediate product, the reaction being carried out most advantageously by treatment of a solution of the wood rosin, or the like, in an organic solvent. In the case of the situation where the reaction is carried out in an organic solvent solution of the wood rosin the intermediate product is desirably recovered in the form of a precipitate. In any event, the intermediate product is then heated at a temperature not appreciably below 145 degrees C. and preferably at a temperature of 160 to 180 degrees C. or somewhat higher. In this heating step, water appears to split out during the reaction and is driven off with the concomitant formation of the desired ether of homo-abietic acid.

We find it advantageous to utilize, in the first step of the method, approximately 10% of formaldehyde, based on the weight of the 1-abietic acid or the 1-abietic acid content of the wood rosin or the like. In general, a percentage of formaldehyde in the range of about 7% to about 10%, by weight of the 1-abietic acid, is quite satisfactory in most cases.

The following examples are illustrative of the practice of our invention. It will be understood that such examples are in no wise intended to be limitative of the full scope of our invention since various changes can be made with respect to selection of rosin source materials of 1-abietic acid; materials which, under the conditions of the reaction, release formaldehyde; proportions of reactants, temperatures, times of heating, and the like, without departing from the spirit of our invention in the light of the guiding principles which we disclose herein.

*Example 1*

(a) An F grade of wood rosin (containing less than 1% nigre) was dissolved in petroleum naphtha having a boiling range of 95–110 degrees C. to produce an approximately 50% concentration of the wood rosin by weight. At such concentration, the solution showed a temperature of about 100 degrees C. when boiling under reflux. Paraformaldehyde flakes in an amount of 3%, by weight of the rosin, were added and refluxing was continued for 16 hours. The resulting solution was clear. It was then cooled and diluted with four volumes of naphtha whereupon a voluminous grayish yellow precipitate was formed. This precipitate settled rapidly and was easily filtered, thus differing markedly from the small quantity of flocculent "nigre" which separates when a solution of ordinary FF wood rosin is diluted with naphtha to the same concentration.

(b) The aforesaid grayish yellow precipitate was, after filtration, washed thoroughly with naphtha and dried in a vacuum oven below 80 degrees C. It was then heated at 145–150 degrees C., whereupon it melted with the evolution of water. The resulting product, a yellow to brownish solid, was found, on analysis, to comprise the ether of homo-abietic acid.

*Example 2*

200 grams of the product produced in accordance with part (a) of Example 1 were refluxed for 18 hours in 1000 cc. of boiling kerosene. The brownish colored suspension in kerosene of the resulting ether of homo-abietic acid was cooled and diluted with four volumes of naphtha. The precipitated ether of homo-abietic acid was recovered by filtration and was then dried. It was a light colored solid, melting at a temperature of 185–190 degrees C.

Although it is preferred to carry out the first step of the method by reacting paraformaldehyde flakes with a naphtha solution of the rosin, other known organic solvents for the rosin can be used as, for example, gasoline, kerosene, etc. In place of paraformaldehyde flakes, formaldehyde gas can be used, the latter being introduced slowly into a boiling solution of the rosin in naphtha or the like, or, for that matter, into a similar solution in the cold or, in other words, at ordinary room temperatures. In this latter case, however, the ultimate yield of the ether of homo-abietic acid is much lower.

We have found that the ether of homo-abietic acid, as well as reaction products containing the same, made in accordance with our invention, is readily soluble in ordinary wood rosin, for example FF wood rosin or wood rosins of higher degrees of purity, and we have further found that the resulting rosin mixtures or solutions have the important and wholly unexpected effect of markedly increased solubility in mineral oils, and triglyceride oils, such as vegetable oils, particularly of the drying oil and semi-drying oil type, such as linseed oil, tung oil, china wood oil, and the like when compared with the solubility in such oils of ordinary untreated wood rosins. It is well known, for example, that ordinary wood rosin, such as the FF wood rosin of commerce, often crystallizes out of solutions of mineral oils such as kerosene, and triglyceride oils such as linseed oil, soybean oil and the like. This lack of permanent solubility of ordinary wood rosins constitutes a serious objection to the use thereof in such industrial products as core oils, ink oils, and various types of varnishes and grinding japans. It has heretofore been known that when wood rosin is heat treated at elevated temperatures, for example, about 265–300 degrees C. for several hours, the rosin loses its tendency to crystallize, a certain amount of decarboxylation takes place together with some isomerization of the resin acids by reason of the heat treatment, yielding a final wood rosin product which is more or less permanently soluble. In such heat treated rosin products, however, there are certain definite objections as, for example, an appreciable reduction in acid number as a result of decarboxylation which takes place during the heat treatment and appreciable losses as a result of volatilization of certain constituents of the rosin due to the elevated temperatures employed in the heat treatment. In the case of the ether of homo-abietic acid and reaction products containing the same, the desired solubility characteristics are obtained without the disadvantages which are part and parcel of the aforesaid heat treatment procedures.

Thus, for example, when 12 or 15 to 35 parts of the ether of homo-abietic acid, or a reaction product containing a substantial amount of the ether of homo-abietic acid, is added to 100 parts of FF wood rosin, the resulting rosin product is completely soluble in a variety of solvents, such as the oleaginous solvents described above, at concentrations ordinarily used in the industry, for instance, 40 to 75 per cent total solids, by weight, and such solutions are stable and show no crystallization or sedimentation on standing for periods of at least several months. The property of the ether of homo-abietic acid in imparting these valuable characteristics to ordinary wood rosins, such as FF wood rosin, is of great industrial importance.

Whenever reference is made in the claims to the ether of homo-abietic acid, it will be understood that it is intended to encompass said ether whether in the form of a pure or substantially pure compound or in the form of a reaction product containing a substantial proportion of said ether, unless the content in any claim expressly indicates otherwise. Similarly, where reference is made to rosin containing a substantial proportion of 1-abietic acid, it will be understood to encompass rosins containing not substantially below 20%, by weight, of 1-abietic acid. Where reference is made in the claims to percentages of formaldehyde, it will be understood that such percentages are based upon the weight of the 1-abietic acid contained in the rosin. In general, with at least most rosins, an amount of about 7% to about 10% of formaldehyde, based on the weight of the 1-abietic acid contained in the rosin, is equivalent to from about 2% to about 4% of formaldehyde, by weight, based on the weight of the rosin.

What we claim as new and desire to protect by Letters Patent of the United States is:

1. A method of producing an ether of homo-abietic acid having the following formula

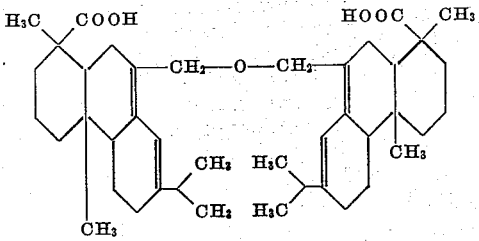

which consists essentially in reacting a rosin containing a substantial proportion of 1-abietic acid with from about 7% to about 10%, by weight, of formaldehyde, based on the 1-abietic acid content of the rosin, at a temperature in the range of room temperature to not appreciably in excess of 120 degrees C. to produce an intermediate product, and then heating said intermediate product at a temperature not substantially below 145 degrees C. but not above the temperature at which decarboxylation occurs, and recovering the resulting ether of homo-abietic acid.

2. A method of producing an ether of homo-abietic acid having the following formula

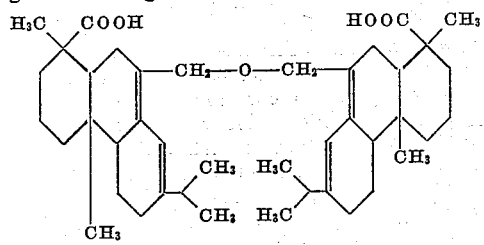

which consists essentially in reacting an organic solvent solution of a rosin containing a substantial proportion of 1-abietic acid with from about 7% to about 10%, by weight, of paraformaldehyde, based on the 1-abietic acid content of the rosin, at a temperature in the range of room temperature to not appreciably in excess of 120 degrees C. to produce an intermediate product, recovering said intermediate product from said solution and then heating it at a temperature between about 145 and about 180 degrees C., and recovering the resulting ether of homo-abietic acid.

3. A method of producing an ether of homo-abietic acid having the following formula

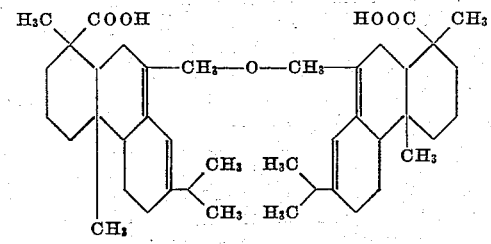

which consists essentially in reacting an organic solvent solution of a rosin containing a substantial proportion of 1-abietic acid with from about 7% to about 10%, by weight, of formaldehyde, based on the 1-abietic acid content of the rosin, said reaction being carried out at substantially the boiling temperature of the solution, precipitating an intermediate product from said solution by adding naphtha thereto, recovering said precipitate, drying it, and then reacting it, in an organic solvent medium in which said precipitate is soluble to dispersible, said latter reaction being carried out at a temperature not substantially below 145 degrees C., but not above the temperature at which decarboxylation occurs and recovering the resulting ether of homo-abietic acid.

4. A method of producing an ether of homo-abietic acid having the following formula

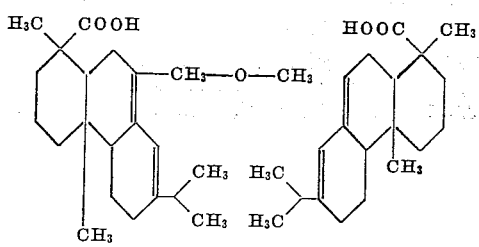

which consists essentially in reacting a petroleum naphtha solution of a rosin containing a substantial proportion of 1-abietic acid with about 7% to about 10%, by weight, of formaldehyde, based on the 1-abietic acid content of the rosin, said reaction being carried out at substantially the boiling temperature of the solution, cooling, precipitating an intermediate product from said solution by adding naphtha thereto, recovering said precipitate, drying it, then heating it at a temperature between about 145 and about 175 degrees C., and recovering the resulting ether of homo-abietic acid.

5. A method of producing an ether of homoabietic acid having the following formula

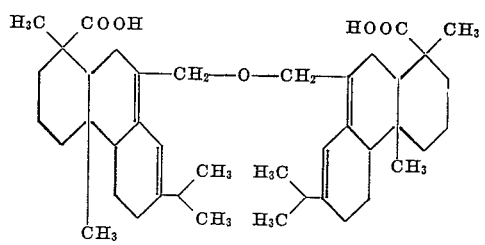

which consists essentially in reacting a petroleum naphtha solution of a rosin containing a substantial proportion of 1-abietic acid with about 10%, by weight, of paraformaldehyde, based on the 1-abietic acid content of the rosin, said reaction being carried out at substantially the boiling temperature of the solution, cooling, and precipitating an intermediate product from said solution by adding several volumes of naphtha thereto, recovering said precipitate, drying it, and then heating it, in an organic solvent medium, said latter reaction being carried out at a temperature between about 145 and about 180 degrees C., and recovering the resulting ether of homo-abietic acid.

6. A new and useful product comprising wood rosin containing from about 12% to about 35%, by weight, of an ether of homo-abietic acid having the following formula

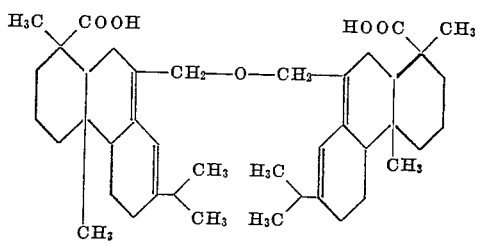

said ether being characterized by ready solubility in rosin, solubility in turpentine at least of substantially the same order as that of wood rosin, and a conjugated double bond system characteristic of 1-abietic acid.

7. A new and useful product comprising FF wood rosin containing from about 15% to about 35%, by weight, of an ether of homo-abietic acid having the following formula

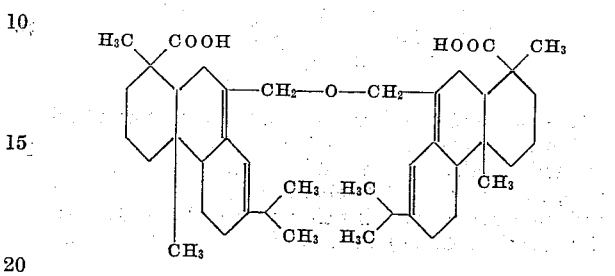

said ether being characterized by ready solubility in rosin, solubility in turpentine at least of substantially the same order as that of wood rosin, and a conjugated double bond system characteristic of 1-abietic acid.

8. A new and useful product comprising a solution, in a member selected from the group consisting of triglyceride oils and mineral oils, of about 40–75%, by weight, of a wood rosin and an ether of homo-abietic acid, said ether comprising from about 12% to about 35%, by weight, of the wood rosin, said ether being characterized by ready solubility in rosin, solubility in turpentine at least of substantially the same order as that of wood rosin and a conjugated double bond system characteristic of 1-abietic acid and having the formula

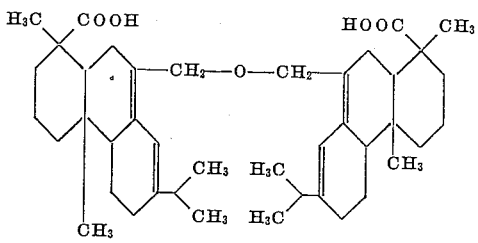

9. A new and useful product comprising a kerosene solution containing about 40–75%, by weight, of a wood rosin and an ether of homo-abietic acid, said ether comprising from about 12% to about 35%, by weight, of the wood rosin, said ether being characterized by ready solubility in rosin, solubility in turpentine at least of substantially the same order as that of wood rosin and a conjugated double bond system characteristic of 1-abietic acid and having the formula

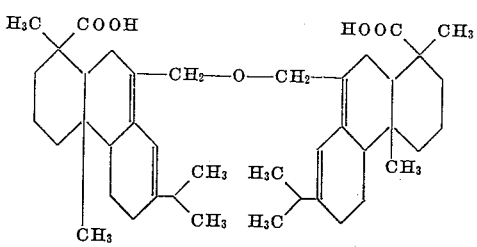

10. A new and useful product comprising a solution, in a vegetable drying oil, of about 40–75%, by weight, of a wood rosin and an ether of homo-abietic acid, said ether comprising from about 12% to about 35%, by weight, of the wood rosin, said ether being characterized by ready solubility in rosin, solubility in turpentine at least of substantially the same order as that of wood rosin and a conjugated double bond system characteristic of 1-abietic acid and having the formula

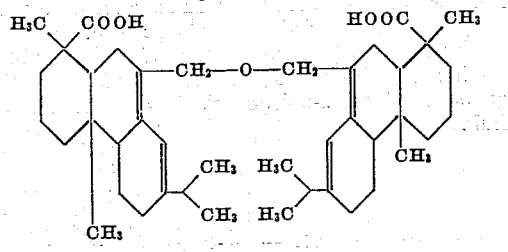

11. A new and useful product comprising a linseed oil solution containing about 40–75%, by weight, of a wood rosin and an ether of homo-abietic acid, said ether comprising from about 12% to about 35%, by weight, of the wood rosin, said ether being characterized by ready solubility in rosin, solubility in turpentine at least of substantially the same order as that of wood rosin and a conjugated double bond system characteristic of 1-abietic acid and having the formula

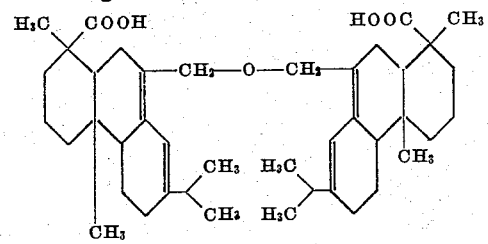

References Cited in the file of this patent

UNITED STATES PATENTS

| | | |
|---|---|---|
| 2,052,073 | Binapfl | Aug. 25, 1936 |
| 2,115,496 | Maters | Apr. 26, 1938 |
| 2,572,071 | St. Clair et al. | Oct. 23, 1951 |